(12) United States Patent
Ott et al.

(10) Patent No.: US 12,049,943 B1
(45) Date of Patent: Jul. 30, 2024

(54) FLEXURED SUN GEARS FOR PLANETARY GEAR SYSTEMS

(71) Applicant: Textron Innovations, Inc., Providence, RI (US)

(72) Inventors: Charles J. Ott, Keller, TX (US); Austin McIntire, Fort Worth, TX (US)

(73) Assignee: Textron Innovations, Inc., Providence, RI (US)

( * ) Notice: Subject to any disclaimer, the term of this patent is extended or adjusted under 35 U.S.C. 154(b) by 0 days.

(21) Appl. No.: 18/457,146

(22) Filed: Aug. 28, 2023

(51) Int. Cl.
*F16H 1/28* (2006.01)
*F16H 1/26* (2006.01)

(52) U.S. Cl.
CPC ............. *F16H 1/2845* (2013.01); *F16H 1/26* (2013.01); *F16H 1/2863* (2013.01)

(58) Field of Classification Search
CPC ......... F16H 1/2845; F16H 1/26; F16H 1/2863
See application file for complete search history.

(56) References Cited

U.S. PATENT DOCUMENTS 3,352,178 A * 11/1967 Lindgren ................. F16H 1/28
475/343
10,107,378 B2 * 10/2018 Miller ....................... F02K 3/06

2017/0159608 A1 * 6/2017 Ertas ................... F16H 57/0006
2021/0214076 A1 * 7/2021 Olson ..................... B64C 29/02
2022/0252144 A1 * 8/2022 Gilliland ................. F16C 19/54

FOREIGN PATENT DOCUMENTS

DE   10302192 A1 * 9/2004  ............. F03D 15/00
EP    3112264 A1 * 1/2017  ........... B64C 25/405

* cited by examiner

*Primary Examiner* — Justin Holmes
(74) *Attorney, Agent, or Firm* — Whitaker Chalk Swindle & Schwartz, PLLC; Enrique Sanchez, Jr.; Juan Vasquez

(57) ABSTRACT

Flexured sun gears for planetary gear systems. In embodiments, a sun gear includes a spline section configured to couple the sun gear to another component, a gear section configured to mesh with at least one other gear of the planetary gear system, and a flexure section configured to couple the spline section to the gear section. The flexure section of the sun gear may have a flexure wall and a flexure curve, and has a thickness (e.g., in at least a portion of the flexure section) that is smaller than a thickness of the spline section and/or the gear section. The flexure section may enable the gear section to displace or move radially with respect to the spline section in response to a rotational force. For example, the flexure section may not move axially (e.g., may not extend) but may bend and/or rotate in response to the rotational force.

20 Claims, 9 Drawing Sheets

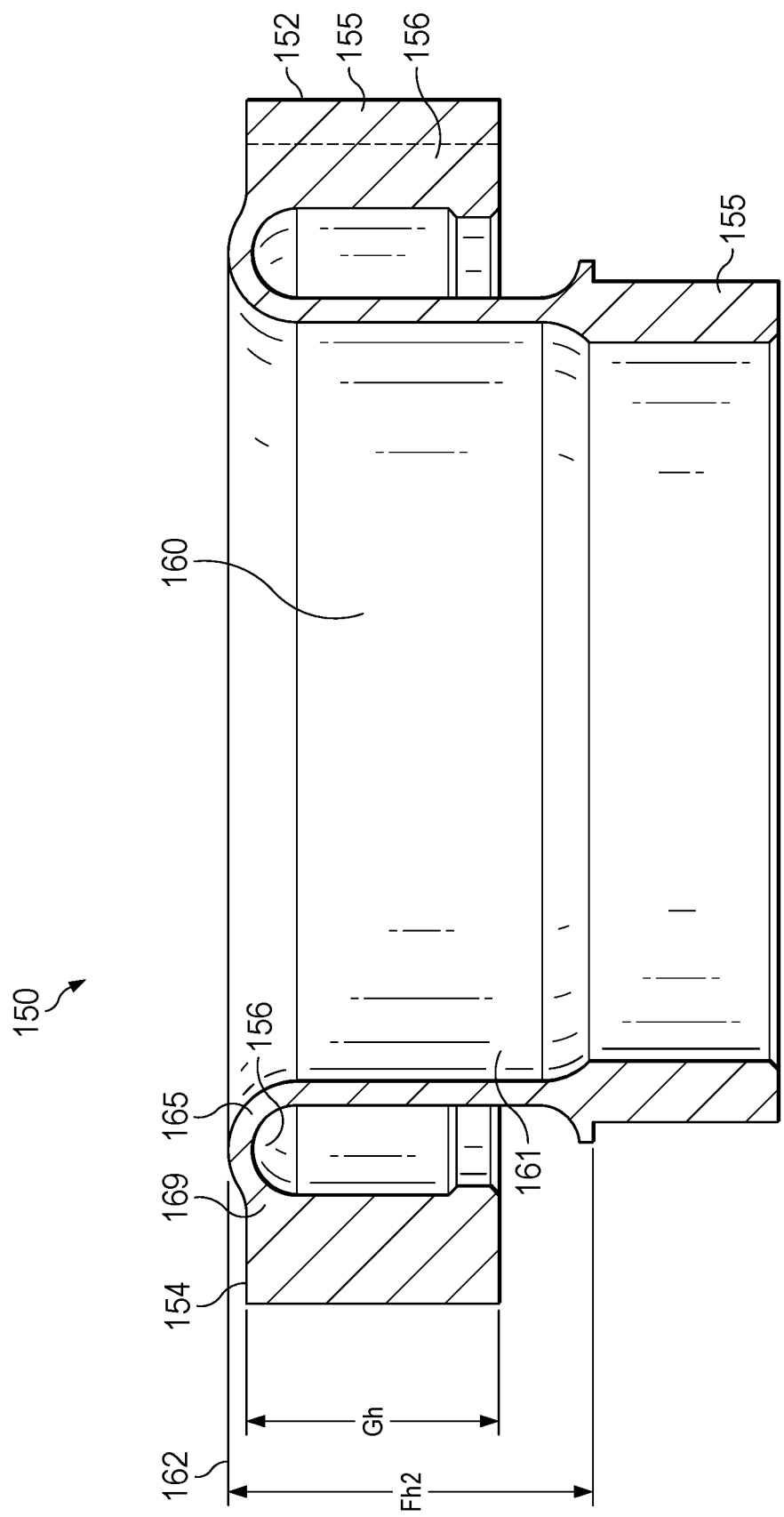

FLEXURED SUN GEARS FOR PLANETARY GEAR SYSTEMS

STATEMENT REGARDING FEDERALLY SPONSORED RESEARCH OR DEVELOPMENT

This invention was made with Government support under Agreement No. W911W6-19-9-0002, awarded by the Army Contracting Command-Redstone Arsenal. The Government has certain rights in the invention.

TECHNICAL FIELD

The present disclosure generally relates to planetary gear systems, and more specifically to flexured sun gears for planetary gear systems.

BACKGROUND

Gear systems enable the transfer of power and/or provide for speed reduction within a system, often in a compact form, and are a vital component of many applications. A particular type of gear system is a planetary gear system, which in its simplest form includes a gear whose center revolves around the center of another gear. A typical planetary gear system includes at least four components, a sun gear, one or more planet gears, a carrier, and a ring gear. In these systems, the one or more planet gears may be mounted on the carrier, and the sun gear may be positioned at the center of the system so as to transmit torque to the one or more planet gears. The one or more planet gears may orbit around the sun gear and may mesh with the ring gear, which may surround both the sun gear and the one or more planet gears.

A particular implementation of a planetary gear may include the transfer of torque from or to the sun gear of the planetary gear. For example, a multi-stage planetary system may operate to facilitate the transmission of an input power and/or speed reduction using a plurality of planetary stages. In these implementations, the sun gear of one stage may receive the torque from another stage and may operate to reduce the speed of the received torque.

For example, FIG. 1A illustrates an example of a multi-stage planetary gear system 50 configured to provide torque/power transmission and speed reduction. In this example, multi-stage planetary gear system 50 may include a high-speed stage 54 and a low-speed stage 55. In this case, each stage of high-speed stage 54 and low-speed stage 55 may include at least a sun gear, one or more planet gears, and a carrier ring. In the example illustrated in FIG. 1A, torque or power may be transmitted from high-speed stage 54 to low-speed stage 55.

FIG. 1B illustrates a cross-sectional view of multi-stage planetary gear system 50. As can be seen, low-speed stage 55 may include sun gear 60, which may include gear teeth 62 and spline teeth 63 configured to functionally couple to carrier 68 of high-speed stage 54, which enables power transmission (and speed reduction) from sun gear 65 (with gear section 67) of high-speed stage 54 to sun gear 60 of low-speed stage 55. In particular, spline teeth 63 may be joined to carrier 68 through a conventional spline connection.

FIG. 1C illustrates a cross-sectional view of a typical sun gear, such as sun gear 60 used in low-speed stage 55 of multi-stage planetary gear system 50. As shown, sun gear 60 may include gear section 61 including gear teeth 62 and spline section 64 including spline teeth 63.

In specific applications, compliance may be introduced into a multi-stage planetary gear system by coupling the sun gear of the low-speed stage to the carrier of the high-speed stage using a floating spline connection, in which the spline section of the low-speed stage is coupled to the carrier of the high-speed stage without fastening (e.g., without clamping, threading, or screwing the spline section and the carrier together). This particular design allows for increased flexibility and adaptability in the system.

However, a problem often encountered with floating spline designs is fretting within the floating spline joint. The root cause of this fretting lies in the different (e.g., relative) motions between the low and high-speed stages. These dissimilar motions may lead to micro-movements at the connection point, which in turn may cause minute wear or fretting. Over time, this fretting can become significant and act as a nucleation site for more substantial fatigue damage. The fatigue damage may compromise the integrity and reliability of the system, leading to potential system failure. In addition, fretted fragments may also remain within the system and may interfere with proper operation and/or lead to potential catastrophic damage.

Attempts have been made to mitigate this fretting issue. However, predicting and controlling fretting in the spline joint has proven difficult due to the complex interplay of factors involved, including but not limited to the torque load, the inherent dissimilar motions of the planetaries, and the design and material properties of the spline itself.

A potential solution to prevent or reduce fretting may include securely fastening the spline joint (e.g., by clamping, threading, and/or screwing the spline section to the carrier) to provide a tight connection. However, securely fastening the spline joint may significantly reduce and even remove compliance, which may cause misalignment in the connection between the spline section and the carrier or in the connection between the sun gear and the planet gears leading to even more problems, and/or may shift the fretting problem to other parts of the multi-stage planetary gear system 50.

As such, in current systems, providing compliance using a floating spline joint aggravates fretting which may lead to catastrophic failures, and using a securely fastened spline joint may remove compliance and may lead to misalignment and potential catastrophic failure.

SUMMARY

The present disclosure achieves technical advantages as systems and methods that provide flexured sun gears for planetary gear systems. In particular embodiments, a sun gear is provided that includes a spline section configured to couple the sun gear to another component, a gear section configured to mesh with at least one other gear of the planetary gear system, and a flexure section configured to couple the spline section to the gear section. In embodiments, the flexure section of the sun gear may have a flexure wall and a flexure curve, and has a thickness (e.g., in at least a portion of the flexure section) that is smaller than a thickness of the spline section and/or the gear section. In embodiments, the flexure section may enable the gear section to displace or move radially with respect to the spline section in response to a rotational force. For example, the flexure section may not move axially (e.g., may not extend) but may bend and/or rotate in response to the rotational force.

The implementation of the flexure section, along with the configuration of the flexure section in accordance with embodiments of the present disclosure, may allow for a planetary gear system in which a spline joint (e.g., the spline joint between the spline section of the sun gear of a second stage and the carrier of a first stage) may be securely fastened without sacrificing compliance within the system. For example, the spline joint may be clamped, threaded, or screwed, thereby securely fastening the spline joint to reduce the dissimilar motions of the first stage carrier and the second stage sun gear and reduce or even eliminate fretting at the spline joint, while providing a level of compliance (e.g., through the flexure section of the second stage sun gear which may allow for radial displacement) that may prevent misalignment issues that are typically present with a securely fastened spline joint. In this manner, a sun gear implemented in accordance with embodiments of the present disclosure addresses the deficiencies of current planetary gear systems as described above.

It is an object of the disclosure to provide a sun gear for a planetary gear system. It is a further object of the disclosure to provide a multi-stage planetary gear system and a method of manufacturing a sun gear for a planetary gear system. These and other objects are provided by the present disclosure, including at least the following embodiments.

In one particular embodiment, a sun gear for a planetary gear system is provided. The sun gear includes a spline section configured to couple the sun gear to another component, a gear section configured to mesh with at least one other gear of the planetary gear system, and a flexure section configured to couple the spline section to the gear section. In embodiments, the flexure section has a flexure wall and a flexure curve, a thickness of at least a portion of the flexure section is smaller than a thickness of one or more of the spline section and the gear section, and the flexure section enables the gear section to displace radially with respect to the spline section in response to a rotational force.

In another embodiment, a multi-stage planetary gear system is provided. The multi-stage planetary gear system includes a high-speed stage configured to generate a rotational force, and a low-speed stage coupled to the high-speed stage and configured to receive the rotational force from the high-speed stage. In embodiments, the low-speed stage having a sun gear includes a gear section, a spline section configured to couple to a carrier gear of the high-speed stage, and a flexure section configured to couple the spline section to the gear section. In embodiments, the flexure section has a flexure wall and a flexure curve, a thickness of at least a portion of the flexure section is smaller than a thickness of one or more of the spline section and the gear section, and the flexure section enables the gear section to displace radially with respect to the spline section in response to the rotational force.

In another embodiment, a method of manufacturing a sun gear for a planetary gear system is provided. The method includes configuring a spline section to couple the sun gear to another component, configuring a gear section to mesh with at least one other gear of the planetary gear system, and disposing a flexure section between the spline section and the gear section. In embodiments, the flexure section has a flexure wall and a flexure curve, a thickness of at least a portion of the flexure section is smaller than a thickness of one or more of the spline section and the gear section, and the flexure section enables the gear section to displace radially with respect to the spline section in response to a rotational force.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following descriptions taken in conjunction with the accompanying drawings, in which:

FIG. 2E is a diagram of still another configuration of an exemplary sun gear configured with capabilities and functionality in accordance with embodiments of the present disclosure.

Figure 1A:
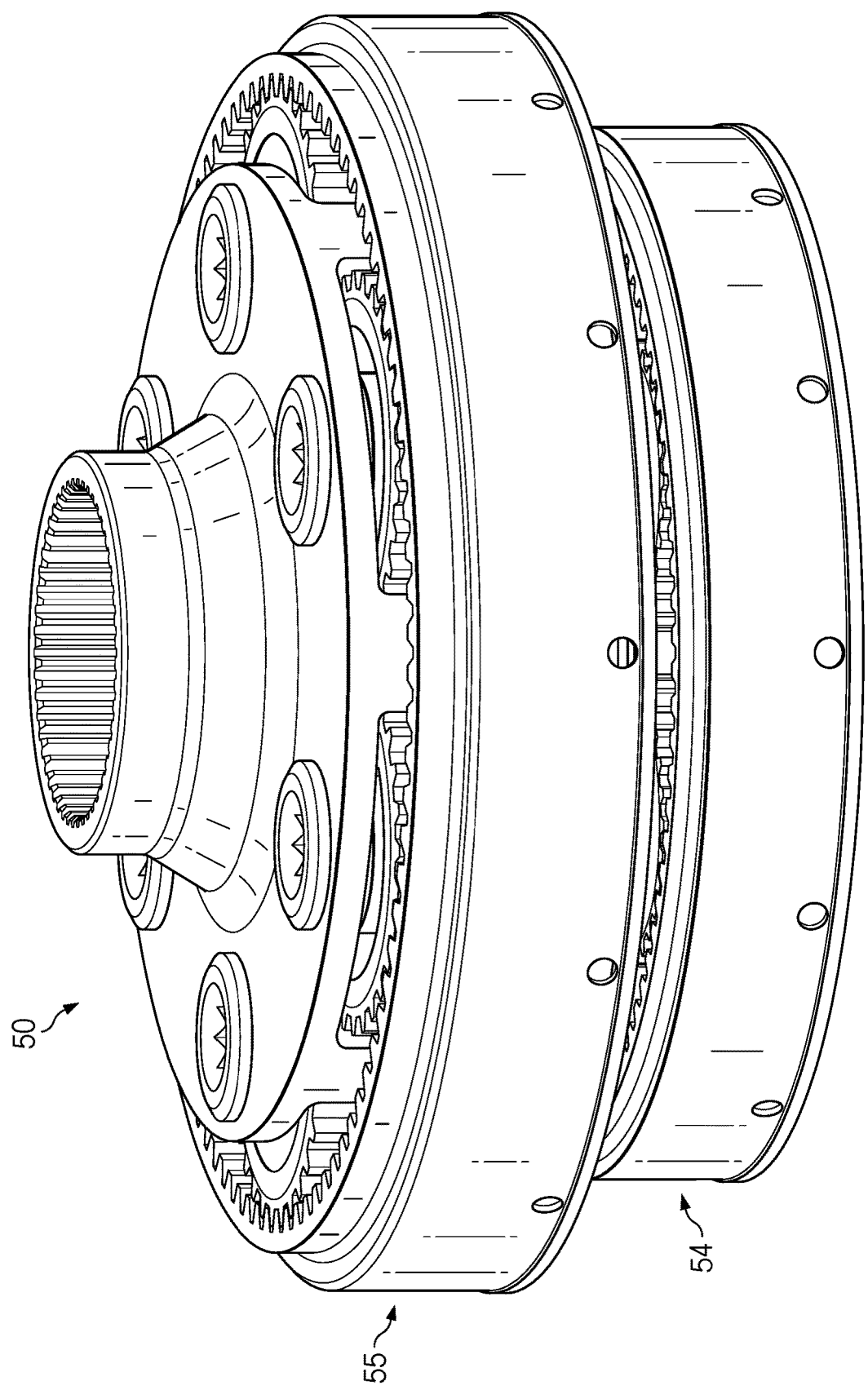
FIG. 1A illustrates an example of a multi-stage planetary gear system configured to provide torque/power transmission and speed reduction.
Figure 1B:
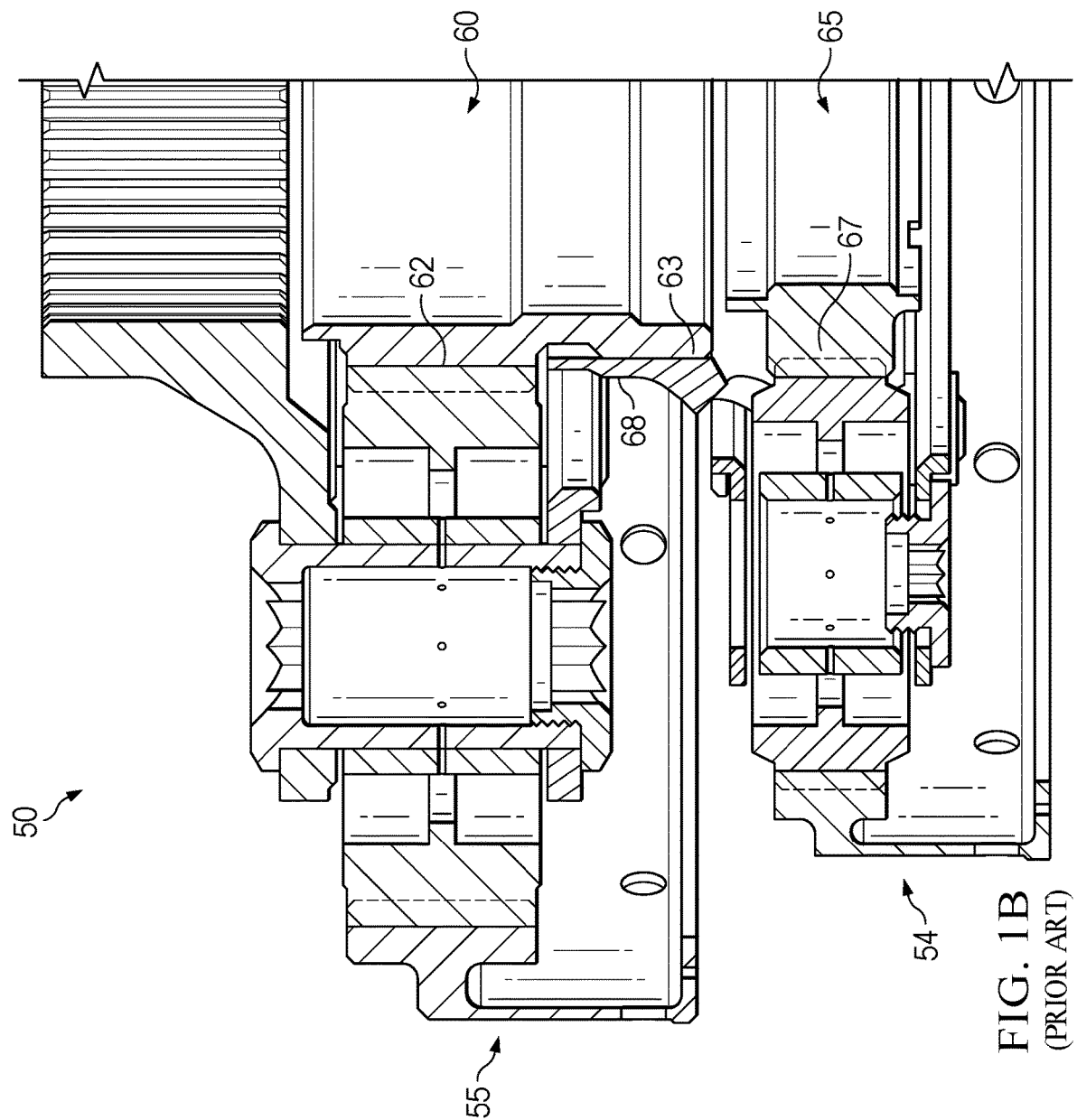
FIG. 1B illustrates a cross-sectional view of multi-stage planetary gear system.
Figure 1C:
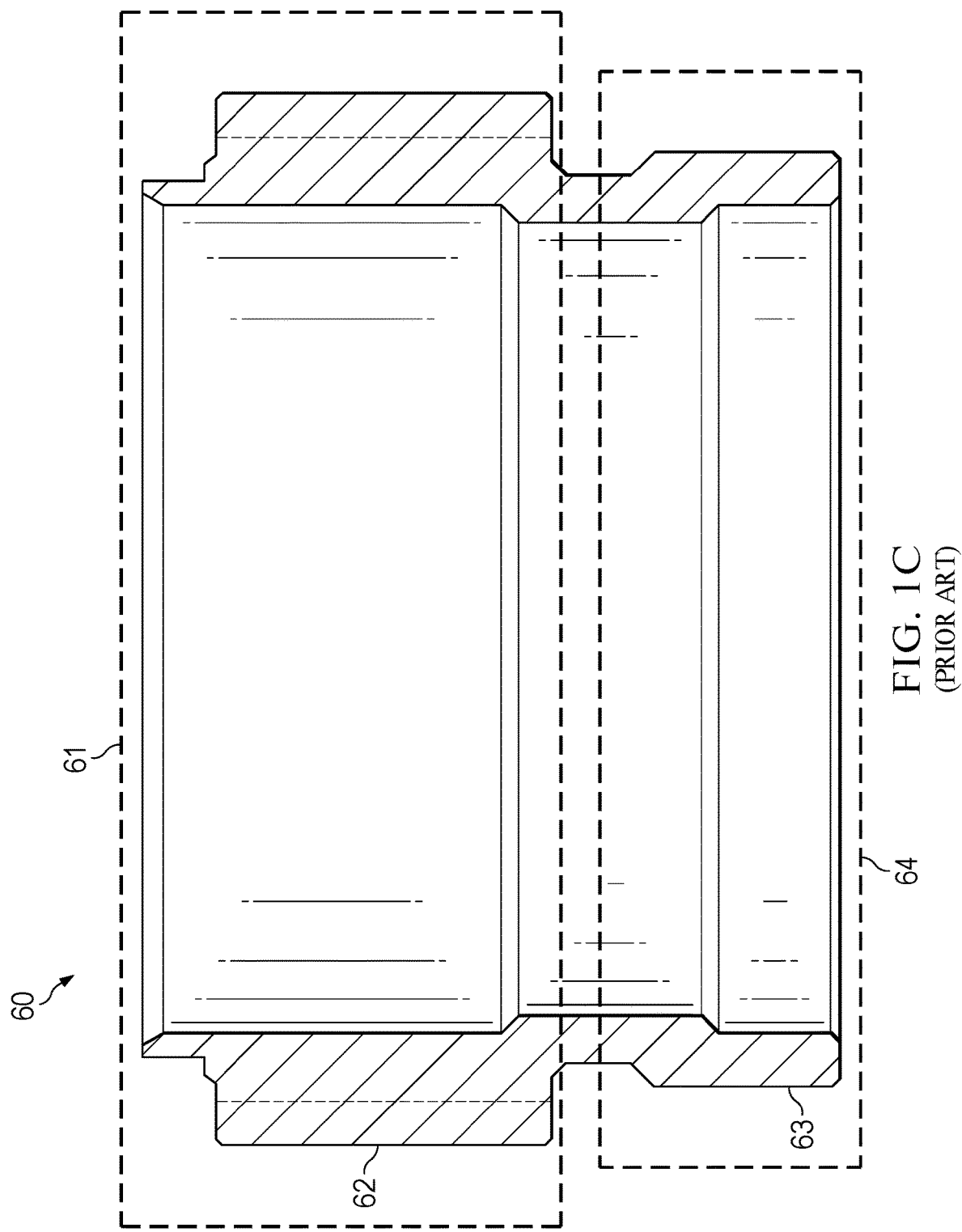
FIG. 1C illustrates a cross-sectional view of a typical sun gear, such as a sun gear used in a low-speed stage of a multi-stage planetary gear system.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

The disclosure presented in the following written description and the various features and advantageous details thereof, are explained more fully with reference to the non-limiting examples included in the accompanying drawings and as detailed in the description. Descriptions of well-known components have been omitted to not unnecessarily obscure the principal features described herein. The examples used in the following description are intended to facilitate an understanding of the ways in which the disclosure can be implemented and practiced. A person of ordinary skill in the art would read this disclosure to mean that any suitable combination of the functionality or exemplary embodiments below could be combined to achieve the subject matter claimed. The disclosure includes either a representative number of species falling within the scope of the genus or structural features common to the members of the genus so that one of ordinary skill in the art can recognize the members of the genus. Accordingly, these examples should not be construed as limiting the scope of the claims.

A person of ordinary skill in the art would understand that any system claims presented herein encompass all of the elements and limitations disclosed therein, and as such, require that each system claim be viewed as a whole. Any reasonably foreseeable items functionally related to the claims are also relevant. The Examiner, after having obtained a thorough understanding of the disclosure and claims of the present application has searched the prior art as disclosed in patents and other published documents, i.e., nonpatent literature. Therefore, as evidenced by issuance of this patent, the prior art fails to disclose or teach the elements and limitations presented in the claims as enabled by the specification and drawings, such that the presented claims are patentable under the applicable laws and rules of this jurisdiction.

Various embodiments of the present disclosure are directed to flexured sun gears for planetary gear systems. In particular, the present disclosure provides for a sun gear for a planetary gear system with functionality that addresses deficiencies of current planetary gear systems. For example, the present disclosure provides for a sun gear that includes a spline section and a gear section, and a flexure section configured to couple the spline section to the gear section. The flexure section may have a thickness (e.g., in at least a portion of the flexure section) that is thinner than a thickness of the spline section and/or the gear section, and may enable the gear section to displace or move radially with respect to the spline section in response to a rotational force. As mentioned above, the configuration of the flexure section in accordance with embodiments of the present disclosure, may allow for a planetary gear system in which a spline joint (e.g., the spline joint between the spline section of the sun gear of a second stage and the carrier of a first stage) may be securely fastened without sacrificing compliance within the system. For example, the spline joint may be clamped, threaded, or screwed, thereby securely fastening the spline joint to reduce the dissimilar motions of the second stage sun gear and the first stage carrier and reduce or even eliminate fretting at the spline joint, while providing a level of compliance (e.g., through the flexure section of the second stage sun gear which may allow for radial displacement) that may prevent misalignment issues that are typically present with a securely fastened spline joint.

It is noted that the functionality of the flexured sun gear of embodiments is described herein with respect to a multi-stage planetary system, and more specifically with respect to a two-stage planetary system. However, this is for illustrative purposes and it is not intended to be limiting in any way. Indeed, in some applications, the flexured sun gear of embodiments may be used in single-stage planetary systems in which the rotational torque, power, or force may be received via the spline section (e.g., via a spline joint) of the flexured sun gear. In some applications, the flexured sun gear of embodiments may be used in multi-stage planetary systems that include more than two stages. In these cases, each stage of the more than two stages may include a flexured sun gear implemented in accordance with the present embodiments, in which case the benefits of the flexure sun gear as described herein may be reaped for more than one stage of the more than two stages of the multi-stage planetary system.

It is also noted that although the present disclosure may focus on a particular application in which the flexured sun gear of embodiments may be used within a component of an aircraft (e.g., a rotary wing aircraft (e.g., a helicopter, vertical takeoff and landing (VTOL) aircraft, etc.), as part of a main propeller of a fixed wing aircraft, etc.), this is for illustrative purposes and it is not intended to be limiting in any way. Indeed, the flexured sun gear of embodiments may be used in other applications in which planetary systems may be used, such as in vehicles, wind turbines, etc.

Figure 2A:
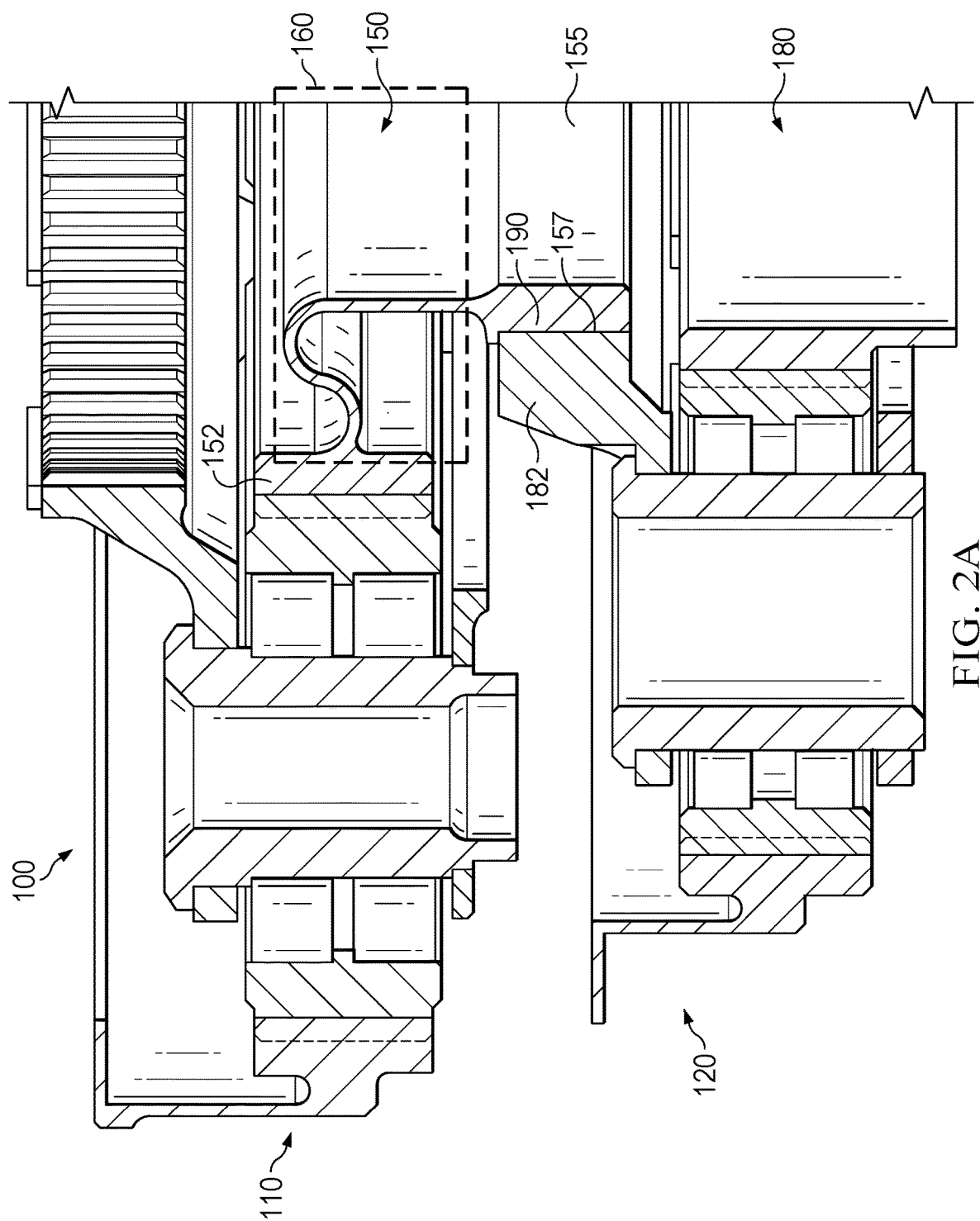
FIG. 2A is a diagram of an exemplary planetary gear system configured with capabilities and functionality in accordance with embodiments of the present disclosure.

FIG. 2A is a diagram of an exemplary planetary gear system 100 configured with capabilities and functionality in accordance with embodiments of the present disclosure. In particular, planetary gear system 100 may include at least one sun gear implemented in accordance with embodiments of the present disclosure. As shown in FIG. 2A, planetary gear system 100 may be a multi-stage planetary gear system that may include second stage 110 and first stage 110. In embodiments, first stage 110 may represent a high-speed stage configured to transmit torque (e.g., in the form of a rotational force or power) to second stage 110, which may represent a low-speed stage. The functionality of first stage 120 and second stage 110 as high-speed and low-speed stages, respectively, may also operate to provide speed reduction from first stage 110 to second stage 110.

In embodiments, first stage 110 may include a sun gear 180 and carrier 182, and second stage 110 may include sun gear 150. During operations, sun gear 180 may receive an input (e.g., a rotational input) having a particular torque and speed, which may cause sun gear 180 to rotate functionally causing carrier 182 to rotate. In embodiments, carrier 182 may be coupled to sun gear 150 of second stage 110 and in this case, the rotation of carrier 182 may cause sun gear 150 to rotate. The rotation of sun gear 150 may operate to rotate gear section 152 of sun gear 150, which may include a plurality of gear teeth, which may cause the planet gears and the ring gear of second stage 110 to rotate, operating at a lower speed than the rotation at which first stage 110 may operate, thereby providing speed reduction functionality and torque transmission from high-speed first stage 110 to low-speed second stage 110. In embodiments, the rotation from second stage 110 may be provided as an output (e.g., to a subsequent additional stage or to another component such as a rotor mast used to drive a propeller of an aircraft) of system 100.

In embodiments, sun gear 150 may be functionally coupled to first stage 110 via spline joint 190, which may represent a joint between spline section 155 of sun gear 150 and carrier 182 of first stage 110. In embodiments, spline joint 190 may be a floating spline joint or a fastened spline joint. A floating spline joint (e.g., in which spline section 155 is coupled to carrier 182 without fastening (e.g., without clamping, threading, or screwing spline section 155 and carrier 182 together)) may provide compliance to system 100, but may result in fretting at spline joint 190 due to the dissimilar motion of spline section 155 and carrier 182 which may cause spline teeth 157 to fret against the teeth of carrier 182. On the other hand, a fastened spline joint (e.g., in which spline section 155 is securely attached or fastened to carrier 182 (e.g., using clamping, threading, a bolt, a nut, or screwing spline section 155 to carrier 182)) may reduce fretting by preventing excessive dissimilar motion of spline section 155 and carrier 182 by removing compliance, but the removing of the compliance from system 100 may cause other issues, such as misalignment between the gear teeth of gear section 152 of sun gear 150 and the teeth of the planet gears to which sun gear 150 may be meshed.

To address the potential issues suffered by spline joint 190, sun gear 150 may include flexure section 160. In embodiments, flexure section 160, which may also be called a compliant web, may be configured to provide strain relief to sun gear 150.

In embodiments, flexure section 160 may be disposed between gear section 152 to spline section 155. For example, flexure section 160 may couple gear section 152 to spline section 155 and may be configured to provide a level of compliance to system 100 by enabling gear section 152 to displace radially with respect to spline section 155 in response to a rotational force. The compliance provided by flexure section 160 may allow sun gear 150 to handle relative motion and ensure alignment between gear section 152 of sun gear 150 and the teeth of the planet gears to which sun gear 150 may be meshed. In addition, the compliance provided by flexure section 160 may enable spline joint 190 to be implemented as a fastened spline joint to reduce fretting at the spline joint while maintain a level of compliance within sun gear 150 (e.g., the compliance provided by flexure section 160).

In embodiments, flexure section 160 may be made of a thin material designed to be compliant. For example, at least a portion of flexure section 160 may have a thickness that is less than the thickness of gear section 150 and/or spline section 155. In some embodiments, the entirety of flexure section 160 may have a thickness that is less than the thickness of gear section 150 and/or spline section 155, and in some other embodiments, a portion less than the entirety of flexure section 160 may have a thickness that is less than the thickness of gear section 150 and/or spline section 155. In embodiments, at least a portion of flexure section 160 may be made of steel, or some other compliant material.

In embodiments, gear section 152, spline section 155, and flexure section 160 may be of unitary construction. For example, gear section 152, spline section 155, and flexure section 160 may be constructed, manufactured, or made of a single unitary piece of material. In some other embodiments, gear section 152, spline section 155, and flexure section 160 may be constructed, manufactured, or made as separate components assembled together.

In embodiments, flexure section 160 may be configured to limit the twisting, bending, or extending of flexure section 160, while allowing radial displacement. For example, flexure section 160 may be limited from excessive (e.g., past a threshold, such as a threshold value up to 30%) extension or contraction (e.g., movement in the direction from the outer diameter of gear section 152 toward the center of sun gear 150, or movement in the direction from the center of sun gear 150 toward the outer diameter of gear section 152) while allowing radial displacement (e.g., movement in the direction of the circumference of gear section 152).

Figure 2B:
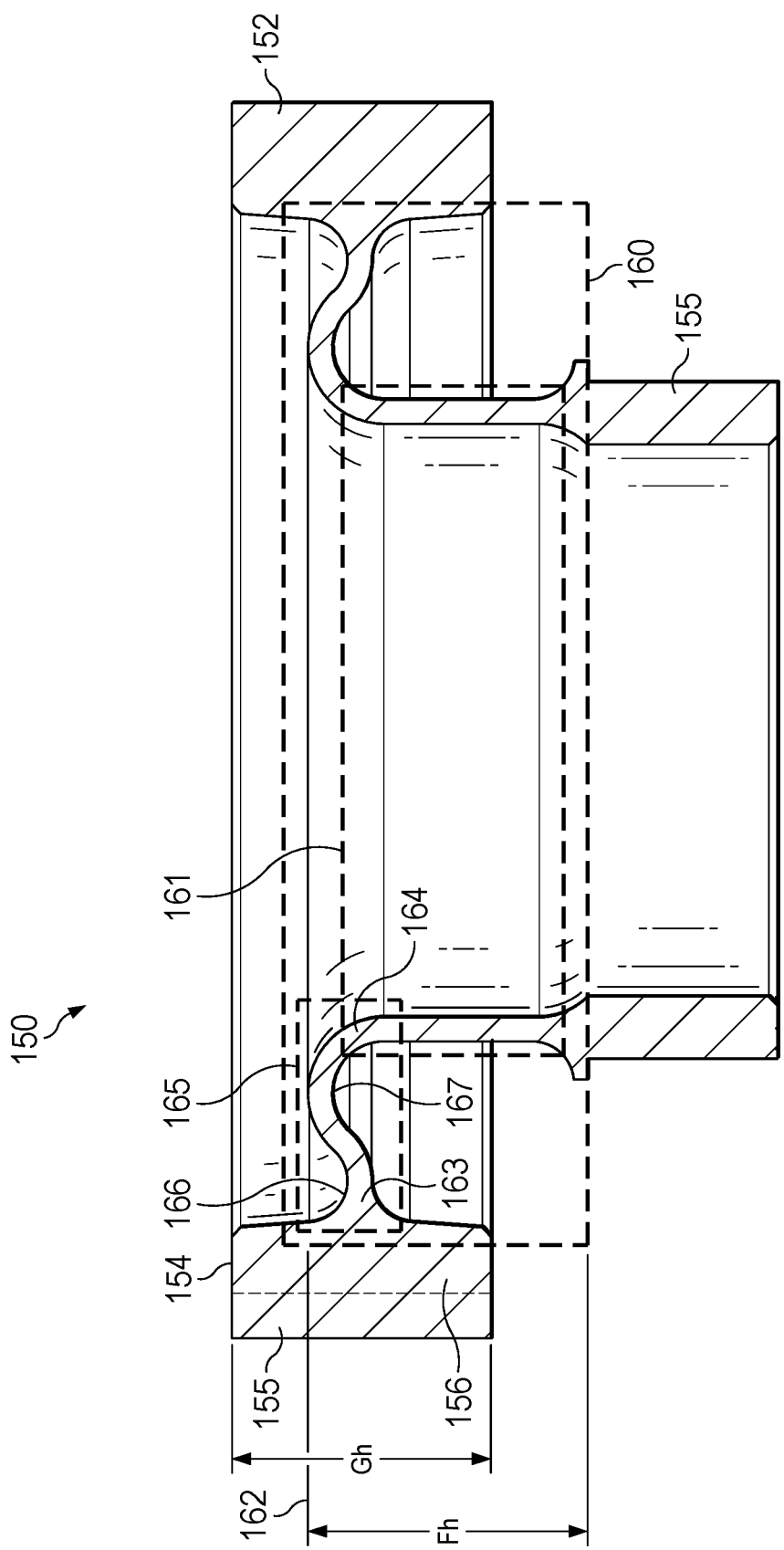
FIG. 2B is a diagram of an exemplary sun gear configured with capabilities and functionality in accordance with embodiments of the present disclosure.

FIG. 2B is a diagram of an exemplary sun gear 150 configured with capabilities and functionality in accordance with embodiments of the present disclosure. As shown in FIG. 2B, sun gear 150 may include gear section 152, spline section 155, and flexure section 160. In embodiments, sun gear 150 may have dimensions (e.g., radius length, etc. of gear section 152 and/or radius, length, etc. of spline section 155) that are substantially similar to (e.g., within 10% of) the diameter of a non-flexured sun gear that may be used in a conventional planetary gear system for performing torque transmission and/or speed reduction similar to the torque transmission and/or speed reduction capabilities of sun gear 150. In this manner, sun gear 150 may replace a conventional sun gear to provide the benefits of a flexure sun gear as disclosed herein.

Figure 2C:
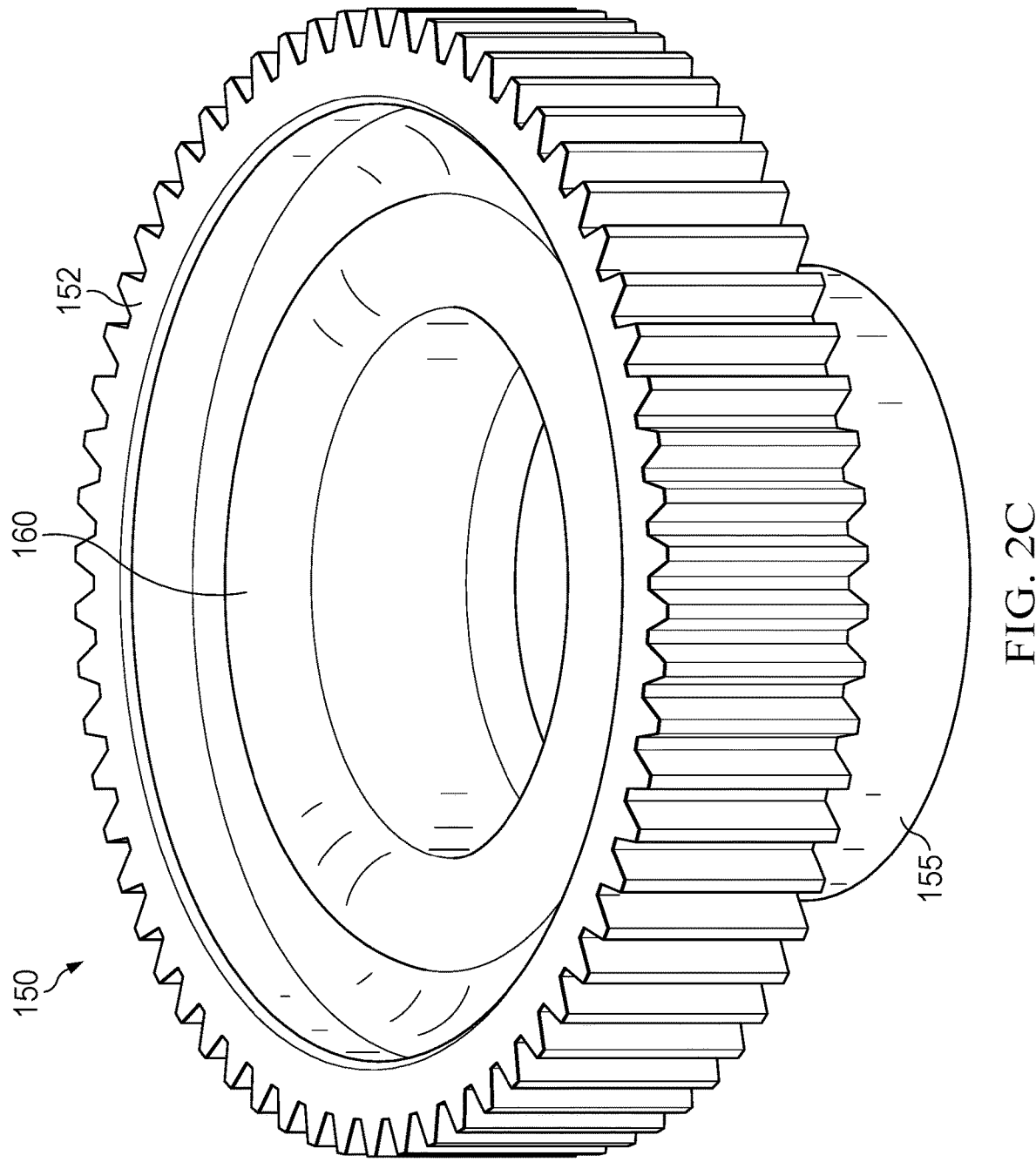
FIG. 2C is a perspective view of an exemplary sun gear configured with capabilities and functionality in accordance with embodiments of the present disclosure.

FIG. 2C is a perspective view of exemplary sun gear 150 configured with capabilities and functionality in accordance with embodiments of the present disclosure.

With reference to FIG. 2B, in embodiments, spline section 155 may be configured to couple sun gear 150 to another component (such as carrier 182 of first stage 110) using a spline joint. In embodiments, spline section 155 may be configured to couple to the another component using a floating spline joint in which in which spline section 155 is coupled to the other component without fastening (e.g., without clamping, threading, or screwing spline section 155 to the other component). In some embodiments, spline section 155 may be configured to couple to the another component using a fastened spline joint, in which spline section 155 may be securely attached or fastened to the other component, such as using clamping, threading, a bolt, a nut, or screwing spline section 155 to the other component.

In embodiments, gear section 152 may be configured to coupled sun gear 150 to one or more planet gears of the planetary gear system to which sun gear 150 belongs (e.g., planetary gear system 100). In embodiments, gear section 152 may include one or more gear teeth 155 configured to mesh with gear teeth of the one or more planet gears of the planetary gear system. In embodiments, gear teeth 155 may be connected to rim 156. For example, gear teeth 155 and rim 156 may be of unitary construction (e.g., may be made of a single unitary piece of material) or may be made as separate components assembled together to for gear section 152.

In embodiments, gear section 152 may have a height Gh from the bottom edge of gear section 152 to top edge 154 of gear section 152. In embodiments, the height of rim 156 may be the same, or substantially the same as (e.g., within 10% of) height Gh of gear section 152.

In embodiments, flexure section 160 may be configured to couple gear section 152 to spline section 155. As mentioned above, flexure section 160 may be configured to provide a level of compliance by enabling gear section 152 to displace radially with respect to spline section 155 in response to a rotational force during operation.

In embodiments, flexure section 160 may be defined by or may include flexure wall 161 and flexure curve 165. Flexure wall 161 may be configured to provide structural support to flexure section 160 and to couple flexure section 160 to spline section 155. For example, flexure wall 161 may include a first end coupled to spline section 155 and a second end 164 coupled to the flexure curve 165. In embodiments, at least a portion of flexure wall 161 (e.g., including the entirety or less than the entirety of flexure wall 161) may be made of a thin material designed to be compliant and may have a thickness that is less than the thickness of gear section 150 and/or spline section 155 providing at least a portion of the compliance provided by sun gear 150.

Flexure curve 165 may be configured to couple flexure section 160 to gear section 152. For example, flexure curve 165 may include a first end 163 coupled to gear section 152 (e.g., coupled to rim 156 of gear section 152) and a second end 164 coupled to flexure wall 161. In embodiments, at least a portion of flexure curve 165 (e.g., including the entirety or less than the entirety of flexure curve 165) may be made of a thin material designed to be compliant and may have a thickness that is less than the thickness of gear section 150 and/or spline section 155 providing at least a portion of the compliance provided by sun gear 150.

In embodiments, flex curve 165 may define at least one curve. For example, flex curve may be made as a flowing curve that curves from rim 156 into flexure wall 161. In embodiments, the one or more curves defined by flex curve 165 may be flowing curves and may be designed to limit sharp turns or corners, as sharp turns or corners may increase stress concentration. In this manner, the flowing curve or curves of flex curve 165, which in embodiments may be subtle curves, may distribute stress or strain over the flowing curve rather than concentrating the stress or strain in a single point.

In embodiments, flexure curve 165 may include one curve or may include more than one curve. For example, as shown in the example illustrated in FIG. 2B, flex curve 165 may include two curves, namely first curve 166 and second curve 167. In embodiments, including more than one curve may enable distribution of the stress over a longer distance, and may permit a more subtle curve to be used. For example, the radius of a single curve may be sharper than the radius of a plurality of curves that may allow a longer length for flexure curve 165. In embodiments, the radius of each of the plurality of curves may be the same, or may be different, and may depend on the design requirements of flexure section 160, which may include based on the height of flexure section 160.

In embodiments, flexure section 160 may have a height Fh defined from the bottom edge of spline section 160 to the top edge 162. The height Fh of flexure section 160 may depend on design requirements for sun gear 150. For example, in embodiments, a higher flexure section 160 may allow for a thicker thickness for the higher flexure section 160 than a shorter flexure section 160 height. This is because a higher flexure section 160 with a thicker thickness may provide a same level of compliance than a shorter flexure section 160 with a thinner thickness. In this manner, a higher flexure section 160 may allow a thicker thickness, which may provide a higher level of structural strength, while allowing a same level of compliance than with a thinner (and shorter) thickness.

In embodiments, the configuration of flexure curve 165 may be based on the height Fh of flexure section 160. For example, in embodiments, a first configuration for flexure curve 165 may be used for a first height Fh, whereas a second configuration for flexure curve 165 may be used for a second height Fh different from the first height Fh. In some embodiments, the different configuration may include a different number of curves in flexure curve 165, a size of the radius of the one or more curves of flexure curve 165, a termination point of flexure curve 165, etc.

Figure 2D:
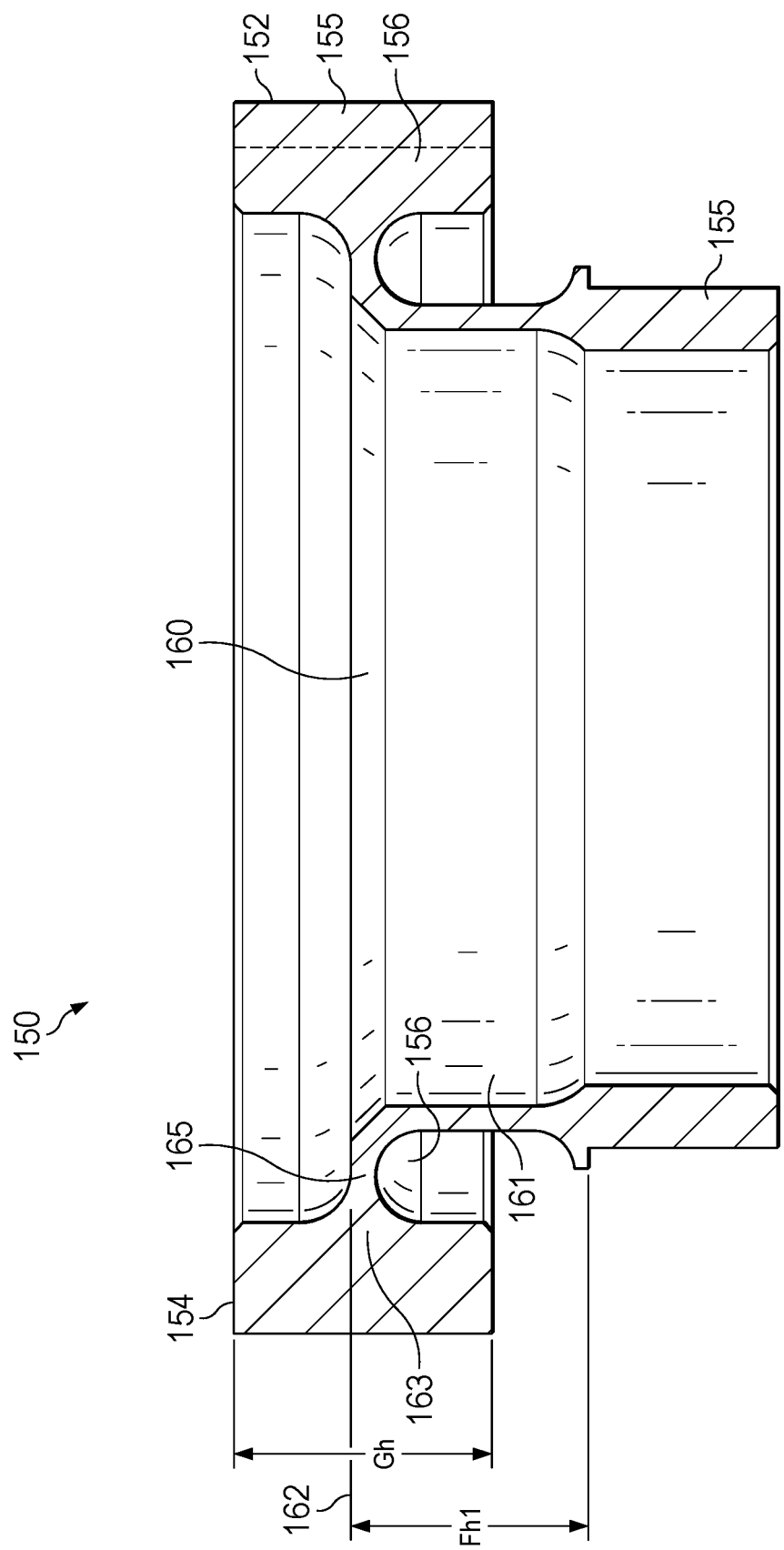
FIG. 2D is a diagram of another configuration of an exemplary sun gear configured with capabilities and functionality in accordance with embodiments of the present disclosure.

With respect to the different number of curves in flexure curve 165 based on the height of flexure section 160, in embodiments, the number of curves in flexure curve 165 may be based on the height of flexure section 160. For example, FIG. 2D is a diagram of another configuration of exemplary sun gear 150 configured with capabilities and functionality in accordance with embodiments of the present disclosure. With reference to FIG. 2D, flexure section 160 of sun gear 150 may have a height Fh1, and this case, the top edge 162 of flexure section 160 may be lower than the top edge 154 of gear section 152, such that top edge 162 of flexure section 160 does not protrude above the plane on which top edge 154 of gear section 152 lies. In this example, flexure curve 165 may be configured with a single curve 156 based on the height Fh1 of flexure section 160.

At this point it is also noted that with respect to the termination point of flexure curve 165 based on the height of flexure section 160, flex curve 165 may terminate at a point within rim 156 of gear section 152 based on the height of flexure section 160. For example, as shown in FIG. 2D, based on height Fh1 of flexure section 160 being less than the height Gh of gear section (e.g., the top edge 162 of flexure section 160 is lower than the top edge 154 of gear section 152) flexure curve 165 may terminate at point 163 within rim 156 of gear section 152 that is substantial centered (e.g., within 10% of center) between the height Gh of gear section 152.

With reference back to FIG. 2B, in this example, flexure section 160 of sun gear 150 may have a height Fh. In this example, the top edge 162 of flexure section 160 may still be lower than the top edge 154 of gear section 152, such that top edge 162 of flexure section 160 still does not protrude above the plane on which top edge 154 of gear section 152 lies. In this example illustrated in FIG. 2B, height Fh of flexure section 160 may be higher than height Fh1 of the flexure section 160 as illustrated in figured 2D. In this example, flexure curve 165 may be configured with a two curves 166 and 167 based on the height Fh of flexure section 160. It is noted that the two curves 166 and 167 in the example of FIG. 2B may allow flexure curve 165 to be longer than in the example illustrated in FIG. 2D in order to handle the higher height Fh of flexure section 160 while maintaining subtle and flowing curve angles, rather than a sharper angled curve that may be necessary with a single curve and a higher height.

Furthermore, in the example illustrated in FIG. 2B, based on height Fh of flexure section 160 being less than the height Gh of gear section (e.g., the top edge 162 of flexure section 160 is lower than the top edge 154 of gear section 152) flexure curve 165 may terminate at point 163 within rim 156 of gear section 152 that is substantial centered (e.g., within 10% of center) between the height Gh of gear section 152.

FIG. 2E is a diagram of still another configuration of exemplary sun gear 150 configured with capabilities and functionality in accordance with embodiments of the present disclosure. In the example illustrated in FIG. 2E, flexure section 160 of sun gear 150 may have a height Fh2, which may be higher than height Fh of the flexure section 160 as illustrated in figured 2B and height Fh1 of the flexure section 160 as illustrated in figured 2D. In this example, the top edge 162 of flexure section 160 may be higher than the top edge 154 of gear section 152, such that top edge 162 of flexure section 160 protrudes above the plane on which top edge 154 of gear section 152 lies. In this example illustrated in FIG. 2E, based on height Fh2 protruding above top edge 154, flexure curve 165 may be configured to terminate at a point 169 within rim 156 of gear section 152. In this case, point 169 is not centered within the height of rim 156 but rather, may be located substantially near (e.g., within 10% of) top edge 154 of gear section 152. In this example, flexure curve 165 may be configured with a single curve 156.

It is noted that in this example illustrated in FIG. 2E, as the height Fh2 causes the top edge 162 of flexure section 160 to protrude above top edge 154 of gear section 152, maintaining a termination point of flexure curve 165 may require a curve or curves with too sharp an angle to reach the significantly higher height Fh2 from the center of rim 156. Even if multiple curves were used, the angles of the curves may be too sharp. In this case, the issue is mitigated by placing the termination point of flexure curve 165 near the top edge 154 of gear section 152, which allows flexure curve 165 to be configured with a single curve while maintaining a subtle flowing curve angle.

Figure 3:
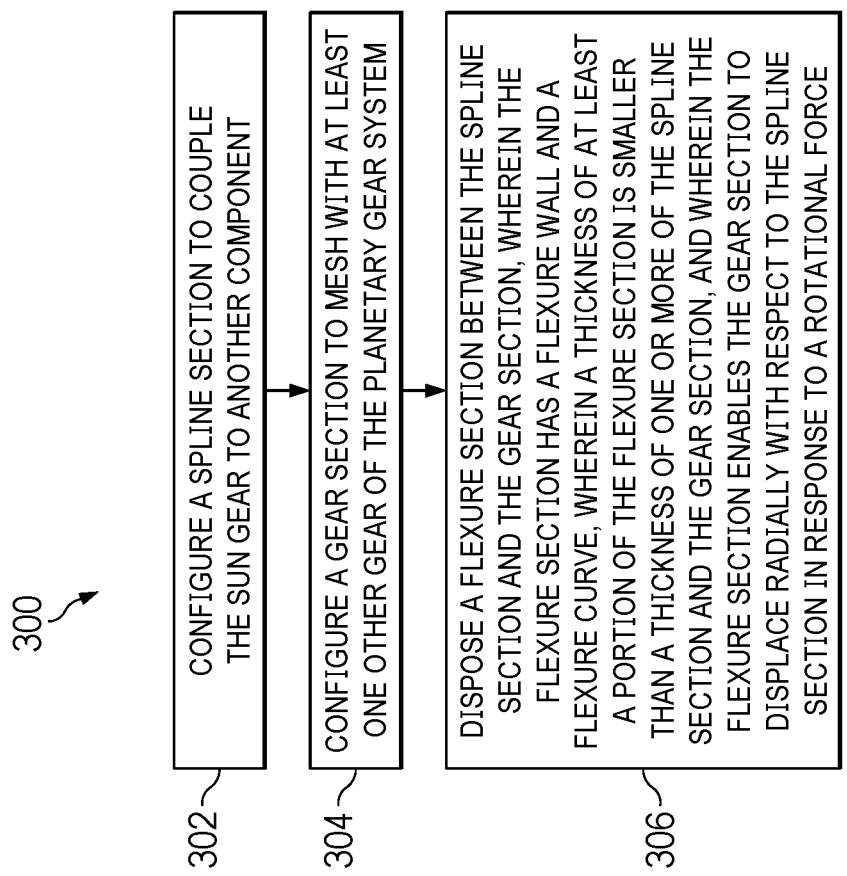
FIG. 3 shows a high-level flow diagram of exemplary operations for manufacturing a sun gear for a planetary gear system configured in accordance with embodiments of the present disclosure.

A method of manufacturing a sun gear for a planetary gear system in accordance with embodiments of the present disclosure will now be discussed with respect to FIG. 3. FIG. 3 shows an exemplary flow diagram 300 of operations for manufacturing a sun gear for a planetary gear system in accordance with embodiments of the present disclosure. For example, the steps illustrated in the example blocks shown in FIG. 3 may be performed to manufacture sun gear 150 of planetary gear system 100, as illustrated in FIGS. 2A-2E, according to embodiments herein.

At block 302, a spline section is configured to couple the sun gear to another component. For example, a spline section (e.g., spline section 155 of sun gear 150 of second stage 110 as illustrated in FIGS. 2A-2E) is configured to couple the sun gear to another component (e.g., carrier 182 of first stage 110 as illustrated in FIG. 2A) according to configuration and functionality described with respect to embodiments of the present disclosure. In embodiments, the spline section may be coupled to the another component using a floating spline joint without fastening, or may be coupled to the another component using a fastened spline joint in which the spline section is securely fastened to the another component, such as by clamping, threading, screwing, bolt and nut, etc.

At block 304, a gear section is configured to mesh with at least one other gear of the planetary gear system. For example, a gear section (e.g., gear section 152 of sun gear 150 as illustrated in FIGS. 2A-2E) may be configured to mesh with one or more planet gears of the planetary gear system to which the sun gear belongs (e.g., planet gears of planetary gear system 100 as illustrated in FIG. 2A) according to configuration and functionality described with respect to embodiments of the present disclosure.

At block 306, a flexure section is disposed between the spline section and the gear section. For example, a flexure section (e.g., flexure section 160 as illustrated in FIGS. 2A-2E) may be disposed between a spline section (e.g., spline section 155 as illustrated in FIGS. 2A-2E) and a gear section (e.g., gear section 152 as illustrated in FIGS. 2A-2E) according to configuration and functionality described with respect to embodiments of the present disclosure. In embodiments, the flexure section may have a flexure wall and a flexure curve, and a thickness of at least a portion of the flexure section is smaller than a thickness of one or more of the spline section and the gear section. In embodiments, the flexure section enables the gear section to displace radially with respect to the spline section in response to a rotational force Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are in-tended to include within their scope such processes, machines, manufacture, compositions of matter, means, methods, or steps.

Moreover, the description in this patent document should not be read as implying that any particular element, step, or function can be an essential or critical element that must be included in the claim scope. Also, none of the claims can be intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim can be understood and intended to refer to structures known to those skilled in the relevant art, as further modified or enhanced by the features of the claims themselves, and can be not intended to invoke 35 U.S.C. § 112(f). Even under the broadest reasonable interpretation, in light of this paragraph of this specification, the claims are not intended to invoke 35 U.S.C. § 112(f) absent the specific language described above.

The disclosure may be embodied in other specific forms without departing from the spirit or essential characteristics thereof. For example, each of the new structures described herein, may be modified to suit particular local variations or requirements while retaining their basic configurations or structural relationships with each other or while performing the same or similar functions described herein. The present embodiments are therefore to be considered in all respects as illustrative and not restrictive. Accordingly, the scope of the disclosures can be established by the appended claims rather than by the foregoing description. All changes which come within the meaning and range of equivalency of the claims are therefore intended to be embraced therein. Further, the individual elements of the claims are not well-understood, routine, or conventional. Instead, the claims are directed to the unconventional inventive concept described in the specification.

What is claimed is:

1. A sun gear for a planetary gear system, the sun gear comprising:
   a spline section configured to couple the sun gear to another component;
   a gear section configured to mesh with at least one other gear of the planetary gear system; and
   a flexure section configured to couple the spline section to the gear section, wherein the flexure section has a flexure wall and a flexure curve, wherein a thickness of at least a portion of the flexure section is smaller than a thickness of one or more of the spline section and the gear section, and wherein the flexure section enables the gear section to displace radially with respect to the spline section in response to a rotational force.

2. The sun gear of claim 1, wherein the flexure wall has a first end coupled to the spline section and a second end coupled to the flexure curve, and wherein the flexure curve has a first end coupled to the gear section and a second end coupled to the flexure wall.

3. The sun gear of claim 2, wherein the flexure section has a height with a top edge and the flexure curve defines at least one curve.

4. The sun gear of claim 3, wherein the at least one curve defined by the flexure curve includes a plurality of curves, and wherein a radius of each of the curves of the plurality of curves has one of: a same radius or a different radius.

5. The sun gear of claim 3, wherein the first end of the flexure curve terminates at one of:
   a point on a rim of the gear section that is located substantially centered on the rim of the gear section when the top edge of the flexure wall is lower than a top edge of the rim of the gear section; and
   a point on the rim of the gear section that is located substantially near the top edge of the rim of the gear section when the top edge of the flexure wall is equal to or higher than the top edge of the rim of the gear section.

6. The sun gear of claim 3, wherein the at least one curve defined by the flexure curve depends on the height of the flexure section such that a first at least one curve for a first height of the flexure section is different from a second at least one curve for a second height of the flexure section.

7. The sun gear of claim 3, wherein the thickness of the at least a portion of the flexure section varies based on the height of the flexure section such that the thickness of the at least a portion of the flexure section having a flexure section of a first height is larger than the thickness of the at least a portion of the flexure section having a flexure section of a second height lower than the first height.

8. The sun gear of claim 1, wherein the spline section is one or more of:
   a floating spline configured to freely couple to the another component such that the spline section is coupled to the another component without fastening; and
   a fastened spline configured to securely fasten the spline section to the another component.

9. The sun gear of claim 8, wherein securely fastening the spline section to the another component includes one or more of:
   clamping the spline section to the another component; and
   threading the spline section to the another component.

10. The sun gear of claim 1, wherein the sun gear is a low-speed sun gear of a multi-stage planetary gear system and the another component is a high-speed carrier of the multi-stage planetary gear system, and wherein the low-speed sun gear is configured to receive the rotational force from the high-speed carrier.

11. A multi-stage planetary gear system, comprising:
    a high-speed stage configured to generate a rotational force; and
    a low-speed stage coupled to the high-speed stage and configured to receive the rotational force from the high-speed stage, the low-speed stage having a sun gear including:
    a gear section;
    a spline section configured to couple to a carrier gear of the high-speed stage; and
    a flexure section configured to couple the spline section to the gear section, wherein the flexure section has a flexure wall and a flexure curve, wherein a thickness of at least a portion of the flexure section is smaller than a thickness of one or more of the spline section and the gear section, and wherein the flexure section enables the gear section to displace radially with respect to the spline section in response to the rotational force.

12. The multi-stage planetary gear system of claim 11, wherein the flexure wall has a first end coupled to the spline section and a second end coupled to the flexure curve, and wherein the flexure curve has a first end coupled to the gear section and a second end coupled to the flexure wall.

13. The multi-stage planetary gear system of claim 12, wherein the flexure section has a height with a top edge and the flexure curve defines at least one curve.

14. The multi-stage planetary gear system of claim 13, wherein the at least one curve defined by the flexure curve includes a plurality of curves, and wherein a radius of each of the curves of the plurality of curves has one of: a same radius or a different radius.

15. The multi-stage planetary gear system of claim 13, wherein the first end of the flexure curve terminates at one of:
    a point on a rim of the gear section that is located substantially centered on the rim of the gear section when the top edge of the flexure wall is lower than a top edge of the rim of the gear section; and
    a point on the rim of the gear section that is located substantially near the top edge of the rim of the gear section when the top edge of the flexure wall is equal to or higher than the top edge of the rim of the gear section.

16. The multi-stage planetary gear system of claim 13, wherein the at least one curve defined by the flexure curve depends on the height of the flexure section such that a first at least one curve for a first height of the flexure section is different from a second at least one curve for a second height of the flexure section.

17. The multi-stage planetary gear system of claim 13, wherein the thickness of the at least a portion of the flexure section varies based on the height of the flexure section such that the thickness of the at least a portion of the flexure section having a flexure section of a first height is larger than the thickness of the at least a portion of the flexure section having a flexure section of a second height lower than the first height.

18. The multi-stage planetary gear system of claim 11, wherein the spline section is one or more of:
    a floating spline configured to freely couple to the another component such that the spline section is coupled to the another component without fastening; and
    a fastened spline configured to securely fasten the spline section to the another component.

19. The multi-stage planetary gear system of claim 18, wherein securely fastening the spline section to the another component includes one or more of:
    clamping the spline section to the another component; and
    threading the spline section to the another component.

20. A method of manufacturing a sun gear for a planetary gear system, comprising:
    configuring a spline section to couple the sun gear to another component;
    configuring a gear section to mesh with at least one other gear of the planetary gear system; and
    disposing a flexure section between the spline section and the gear section, wherein the flexure section has a flexure wall and a flexure curve, wherein a thickness of at least a portion of the flexure section is smaller than a thickness of one or more of the spline section and the gear section, and wherein the flexure section enables the gear section to displace radially with respect to the spline section in response to a rotational force.

* * * * *